United States Patent
Zhang

(10) Patent No.: US 11,294,995 B2
(45) Date of Patent: Apr. 5, 2022

(54) METHOD AND APPARATUS FOR IDENTITY AUTHENTICATION, AND COMPUTER READABLE STORAGE MEDIUM

(71) Applicant: BEIJING BAIDU NETCOM SCIENCE AND TECHNOLOGY CO., LTD., Beijing (CN)

(72) Inventor: Runqi Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 398 days.

(21) Appl. No.: 16/507,195

(22) Filed: Jul. 10, 2019

(65) Prior Publication Data

US 2020/0019687 A1 Jan. 16, 2020

(30) Foreign Application Priority Data

Jul. 12, 2018 (CN) .......................... 201810766166.2

(51) Int. Cl.
*G06F 21/32* (2013.01)
*G10L 17/22* (2013.01)

(52) U.S. Cl.
CPC .............. *G06F 21/32* (2013.01); *G10L 17/22* (2013.01)

(58) Field of Classification Search
CPC . G06F 21/32; G06F 3/16; G10L 17/22; G10L 17/00; G06Q 20/40; H04L 29/06
See application file for complete search history.

(56) References Cited

U.S. PATENT DOCUMENTS

| 2015/0154962 | A1* | 6/2015 | Blouet | G10L 17/22 |
| | | | | 704/273 |
| 2016/0006730 | A1* | 1/2016 | Chari | H04L 63/0861 |
| | | | | 726/7 |
| 2017/0178135 | A1* | 6/2017 | Bull | G06Q 10/1057 |
| 2018/0047394 | A1* | 2/2018 | Tian | G10L 17/22 |
| 2018/0146370 | A1* | 5/2018 | Krishnaswamy | G06F 16/951 |
| 2018/0233142 | A1* | 8/2018 | Koishi | G06F 1/329 |
| 2018/0337994 | A1* | 11/2018 | Dachille | H04L 67/1097 |
| 2018/0374475 | A1* | 12/2018 | Lewis | G06N 20/10 |
| 2018/0374486 | A1* | 12/2018 | Zhao | G10L 15/16 |

(Continued)

FOREIGN PATENT DOCUMENTS

| CN | 1040834847 A | 8/2015 |
| CN | 1050359006 A | 2/2016 |

(Continued)

OTHER PUBLICATIONS

Wang Yo-biao et al., "Robustness in speaker recognition", Journal of the Acoustic Society of Japan, vol. 69, No. 7 (2013), pp. 357-364.

(Continued)

*Primary Examiner* — Brian E Miller
(74) *Attorney, Agent, or Firm* — Fay Sharpe LLP

(57) ABSTRACT

Embodiments of the present disclosure relate to a method and an apparatus for identity authentication, an electronic device, and a computer readable storage medium. The method for identity authentication includes: acquiring a signal of a speech of a user; generating feature data with a plurality of dimensions based on the signal, the feature data with the plurality of dimensions indicate different characteristics of the signal; and determining an identity of the user based on the feature data.

11 Claims, 3 Drawing Sheets

(56) References Cited

U.S. PATENT DOCUMENTS

| | | | | |
|---|---|---|---|---|
| 2019/0156002 | A1* | 5/2019 | Liu | G10L 17/00 |
| 2019/0204907 | A1* | 7/2019 | Xie | A63F 13/424 |
| 2019/0371300 | A1* | 12/2019 | Park | G10L 15/26 |
| 2019/0373436 | A1* | 12/2019 | Garg | H04L 63/1433 |
| 2019/0385617 | A1* | 12/2019 | Kang | H04W 72/042 |
| 2020/0019687 | A1* | 1/2020 | Zhang | G10L 17/00 |
| 2020/0034740 | A1* | 1/2020 | Yang | G06K 9/6247 |
| 2020/0065833 | A1* | 2/2020 | Cantley | G06Q 30/04 |
| 2020/0169591 | A1* | 5/2020 | Ingel | G10L 17/00 |
| 2020/0302928 | A1* | 9/2020 | Sohn | H04L 12/28 |
| 2020/0372911 | A1* | 11/2020 | Seo | G10L 17/00 |
| 2020/0394631 | A1* | 12/2020 | Castor | G06Q 20/20 |
| 2021/0042736 | A1* | 2/2021 | Kursun | G06Q 20/405 |
| 2021/0112098 | A1* | 4/2021 | Lillie | H04L 63/0861 |
| 2021/0272121 | A1* | 9/2021 | Harris | G06N 5/048 |

FOREIGN PATENT DOCUMENTS

| | | |
|---|---|---|
| CN | 1070068154 A | 8/2017 |
| CN | 1070221331 A | 9/2017 |
| CN | 1080040032 A | 5/2018 |
| JP | H02236599 A | 9/1990 |
| JP | H03274597 A | 12/1991 |
| JP | 2000181490 A | 6/2000 |
| JP | 2004199053 A | 7/2004 |
| JP | 2007052720 A | 3/2007 |
| JP | 2009251019 A | 10/2009 |
| JP | 2014048534 A | 3/2014 |
| JP | 2018092122 A | 6/2018 |
| KR | 20140139982 A | 12/2014 |

OTHER PUBLICATIONS

Office Action for Korean Application No. 10-2019-0081471, dated Sep. 17, 2020, 8 pages.
Office Action for Japanese Application No. 2019-129753, dated Sep. 1, 2020, 10 pages.
Office Action for Japanese Application No. 2019-129753, dated Feb. 9, 2021, 3 pages.
Chinese Office Action for Application No. 201810766166.2, dated Jan. 22, 2020 (with English Translation, 9 pages).
Office Action for Japanese Application 2019-129753, dated Aug. 3, 2021, 3 pages.

* cited by examiner

METHOD AND APPARATUS FOR IDENTITY AUTHENTICATION, AND COMPUTER READABLE STORAGE MEDIUM

CROSS-REFERENCE TO RELATED APPLICATION

The present application is based upon and claims priority to Chinese Patent Application No. 201810766166.2, filed on Jul. 12, 2018, the entirety contents of which are incorporated herein by reference.

FIELD

Embodiments of the present disclosure generally relate to identity authentication, and more particularly, to a method and an apparatus for identity authentication (especially for identity authentication based on speech or voice), an electronic device, and a computer readable storage medium.

BACKGROUND

With the development of intelligent sound boxes (speakers) and other products, identity authentication based on speech becomes more and more important. At present, however, identity authentication based on speech still stays at a superficial technical level. For example, a common scenario of identity authentication is one based on frequency (or speech frequency band). In such scenario, a set of speech frequency range is usually set for each user. If the received sound exceeds out of an error range by a certain threshold, the authentication fails. The authentication is passed if the received speech is in the same range as the user's speech. However, as the human ear can recognize the voice with a frequency range of 20 Hz to 20 kHz, the "legal" frequency can be quickly found by a method of exhaustion, resulting in a very low safety factor. Thus, it is necessary to provide a technical solution for identity authentication that addresses at least a part of the above technical problems.

SUMMARY

Embodiments of the present disclosure provide a solution for identity authentication.

Embodiments of the present disclosure provide a method for identity authentication. The method includes: acquiring a signal of a speech of a user; generating feature data with a plurality of dimensions based on the signal, the feature data with the plurality of dimensions indicate different characteristics of the signal; and determining an identity of the user based on the feature data.

Embodiments of the present disclosure provide an apparatus for identity authentication. The apparatus includes: a first acquiring module, configured to acquire a signal of a speech of a user; a generating module, configured to generate feature data with a plurality of dimensions based on the signal, the feature data with the plurality of dimensions indicate different characteristics of the signal; and a first determining module, configured to determine an identity of the user based on the feature data.

Embodiments of the present disclosure provide a computer readable storage medium, stored thereon with computer programs that, when executed by a processor, the processor is caused to perform the method for identity authentication according to embodiments of the present disclosure.

It should be understood that, contents described in the summary is not intended to limit key or important features of embodiments of the present disclosure, and is also not intended to limit the scope of the present disclosure. Other features of the present disclosure will become more readily appreciated from the following descriptions.

BRIEF DESCRIPTION OF THE DRAWINGS

The above and other features, advantages and aspects of embodiments of the present disclosure will become apparent from the following descriptions made with reference to the accompanying drawings. The same or similar numbers in different drawings represent the same or similar elements unless otherwise represented.

DETAILED DESCRIPTION

Embodiments of the present disclosure are described in detail with reference to the accompanying drawings below. Although some embodiments of present disclosure are shown in the accompanying drawings, it should be understood that, the present disclosure may be implemented in various forms and should not be interpreted as limited to the embodiments described herein, but rather provided for a more thorough and complete understanding of the present disclosure. It should be understood that, embodiments described herein with reference to drawings are explanatory, and are not construed to limit the scope of the present disclosure.

As mentioned above, at present the solution of a voice-based identity authentication usually determines an identity of a user based on the frequency of a speech to determine whether the authentication is successful or not. However, such authentication solution has a low safety factor.

Aiming at the above and other potential issues, embodiments of the present disclosure provide a technical solution for identity authentication. In the solution, a signal of a speech of a user is acquired, and feature data with a plurality of dimensions are generated based on the signal. The feature data with the plurality of dimensions indicate different characteristics of the signal. The identity of the user is determined based on the feature data. As the identity authentication is performed according to the signal with the plurality of different dimensions, the accuracy and security of the identity authentication may be improved.

Embodiments of the present disclosure are described in detail in combination with FIGS. 1 to 4.

Figure 1:
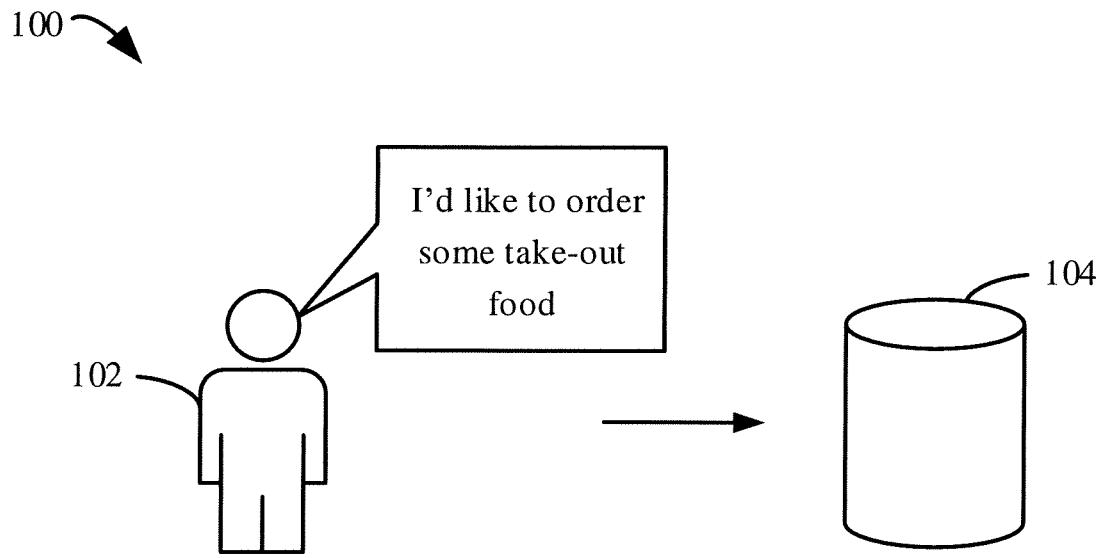
FIG. 1 is a schematic diagram illustrating an exemplary environment in which embodiments of the present disclosure can be implemented.

FIG. 1 is a schematic diagram illustrating an exemplary environment 100 in which embodiments of the present disclosure can be implemented. In the environment 100, a user 102 may conduct a speech interaction with an electronic device such as an intelligent sound box (speaker) 104. For example, the user 102 may talk to the intelligent sound box 104 a speech that "I'd like to order a takeaway". The intelligent sound box 104 may obtain the signal of the speech and determine based on the signal whether the user 102 has a permission to perform the corresponding task. It should be understood that, although the intelligent sound box 104 is described here as an example, the embodiments in the present disclosure may also be applied to a mobile phone, a tablet and other electronic devices, and may be implemented at least partially in the cloud.

Figure 2:
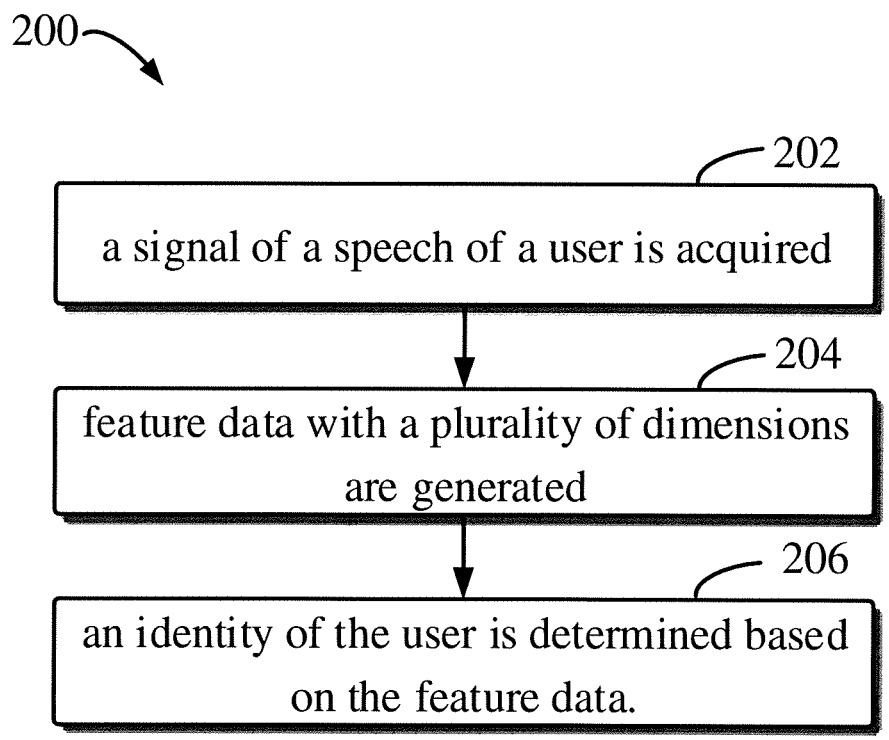
FIG. 2 is a flow chart illustrating a method for identity authentication according to some embodiments of the present disclosure.

FIG. 2 is a flow chart illustrating a method 200 for identity authentication according to some embodiments of the present disclosure. The method 200 can be implemented at least partially by the intelligent sound box 104 shown in FIG. 1.

At block 202, the intelligent sound box 104 acquires the signal of the speech of the user 102. For example, the intelligent sound box 104 may include apparatuses such as microphones that record or collect the signal of the speech of the user 102. In some embodiments, the signal of the speech of the user 102 may include a conversation, which may be defined by a start sentence and an end sentence and associated with a corresponding task. For example, by means of the speech recognition, the intelligent sound box 104 may determine the start sentence by recognizing the intention of the user 102 on the task, and the intelligent sound box 104 can judge the end sentence by identifying a final instruction of user 102 for the task. The start and end sentences may be determined by identifying the keywords. For example, this conversation may include a plurality of sentences between the intelligent sound box 104 identifying the user's intention to place an order and receiving an order from the user.

At block 204, the intelligent sound box 104 generates feature data with a plurality of dimensions based on the signal of the speech of the user 102. The feature data for each dimension may indicate corresponding characteristics of the signal. For example, the plurality of dimensions may include at least two of speed, loudness, pitch, frequency, and timbre of the signal. It should be understood that, the speed, loudness, frequency and other information may be detected by any appropriate method currently known or developed in the future, which is not limited herein. In addition, those skilled in the art should understand that, the above dimensions are provided only as examples, and feature data from other dimensions may be used optionally or additionally.

In some embodiments, the feature data may be normalized. For example, a sentence may be parsed into an n-dimensional vector, for example: [D0, D1, . . . , Dn], where Di, i=1 . . . N, represents a dimension (for example, frequency), and Di is evaluated in an interval of (0, 1). In this way, vector representations of the feature data may be determined for subsequent processing.

At block 206, the intelligent sound box 104 determines the identity of the user 102 based on the generated feature data. For example, the identity of the user 102 may be associated with the corresponding permission, thus the permission of the user 102 may be determined based on the identity of the user 102, and a task matching the permission of the user 102 is triggered to be executed. In other words, if the permission of the user 102 matches a task, the task is executed.

In some embodiments, the above task may be identified from the signal of the speech of the user 102. For example, the intelligent sound box 104 may perform speech recognition to the signal of the speech of the user 102 and determine the user's intention (e.g., a task the user wants to execute) from the recognized words or sentences. For example, the permission of the user 102 may also be associated with the corresponding task, that is, different tasks may have different permissions.

In some embodiments, the intelligent sound box may determine a category associated with the signal based on the feature data. For example, the category may be determined by an unsupervised learning model. For example, the unsupervised learning model may receive vector representations of the feature data, and determine the category associated with the signal through clustering based on the vector representations of the feature data. The unsupervised learning model may include a k-means, a random forest and other models. It should be understood that, the above unsupervised learning model is provided only as an example, and that other appropriate unsupervised learning models may be used by those skilled in the art.

The unsupervised learning model may be built naturally from daily conversations and exchanges between users and the intelligent sound box 104 (or other speech devices), and continuously optimized. It's cost effective, and capable of real-time learning. Each conversation is both an application and a training for the model. Therefore, the unsupervised learning model does not need to collect user data and label the collected user data. In this way, lightweight products can be achieved and privacy issues that may arise when collecting user data can be prevented.

In some embodiments, the intelligent sound box 104 may obtain a correspondence between the category of the signal and the identity of the user and determine the identity of the user as the identity corresponding to the category based on the correspondence. The correspondence between the category and identity may be preset by the user 102. For example, the user 102 may say out the identity and the enabled permission in a sentence, for example, "my name is Xiao Ming and I have a payment permission." The intelligent sound box 104 may establish a correspondence between the determined sentence or the category of associated interactive conversation and the identity as well as the permission provided in this sentence. Upon first authorization, the user may be asked to enter a password, etc., for authentication.

In some embodiments, the user 102 may be authenticated in the course of the interaction with the intelligent sound box 104. For example, the intelligent sound box 104 may initiate an authorization detection process based on trigger conditions such as keywords. For example, the intelligent sound box 104 may perform a speech recognition on the signal of the speech of the user 102, and if the keyword such as "takeaway" is detected in the identified words, the authorization determination process is initiated.

Figure 3:
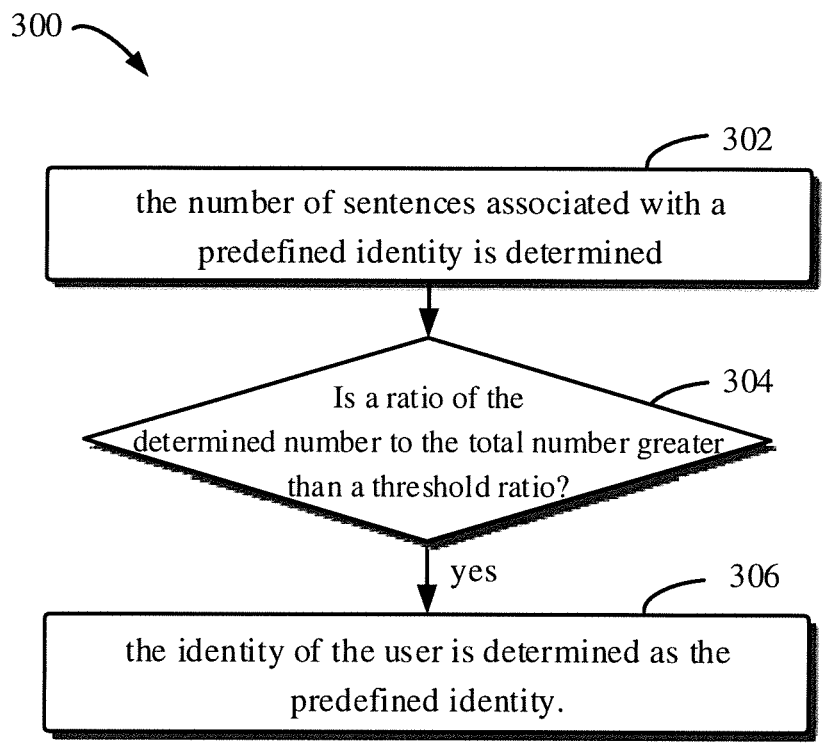
FIG. 3 is a flow chart illustrating a method for determining an identity of a user according to some embodiments of the present disclosure.

FIG. 3 is a flow chart illustrating a method 300 for determining an identity of a user according to some embodiments of the present disclosure. For example, the signal may include a conversation after the authorization determination process is initiated, and the conversation may include a plurality of sentences.

At block 302, the number of sentences associated with a predefined identity and included in the signal may be determined. For example, a conversation including ten sentences which starts with one of confirming a purchase intention and ends with one of receiving an order. The category and identity corresponding to each sentence may be determined. For example, it may be determined that eight sentences have identity A (for example, the husband) among the ten sentences.

At block 304, it may be determined whether a ratio of the determined number to a total number of sentences included in the voice signal is greater than a threshold ratio. If it is greater than the threshold ratio, the method 300 advances to block 306. At block 306, the identity of the user may be determined as the predefined identity. For example, if the threshold ratio is 70%, the ratio of the determined number to the total number is 8/10=80%, which is greater than 70%. On the contrary, if it is less than the threshold ratio, it can be determined that the voice signal does not have the predefined identity.

The embodiment shown in FIG. 3 may solve the problem of single sentence recognition rate and accuracy that are difficult to reach 100% in intelligent sound boxes and other devices. A probabilistic result may compensate for individual differences in a single sample, thus more accurate.

In addition, the method 300 may be implemented in a natural language interaction between the user 102 and the intelligent sound box 104, instead of in an independent process. Therefore, the determination may be performed throughout the natural language conversation scene without stiff interactions. For example, the user 102 may interact with the intelligent sound box 104 as follows:

User: I'd like to order some take-out food.
Sound box: inquiring and recommending an order. XX package is recommended to you.
Would you like to buy it?
User: Yes!
Sound box: Your permission has been confirmed. The purchase is completed.

Figure 4:
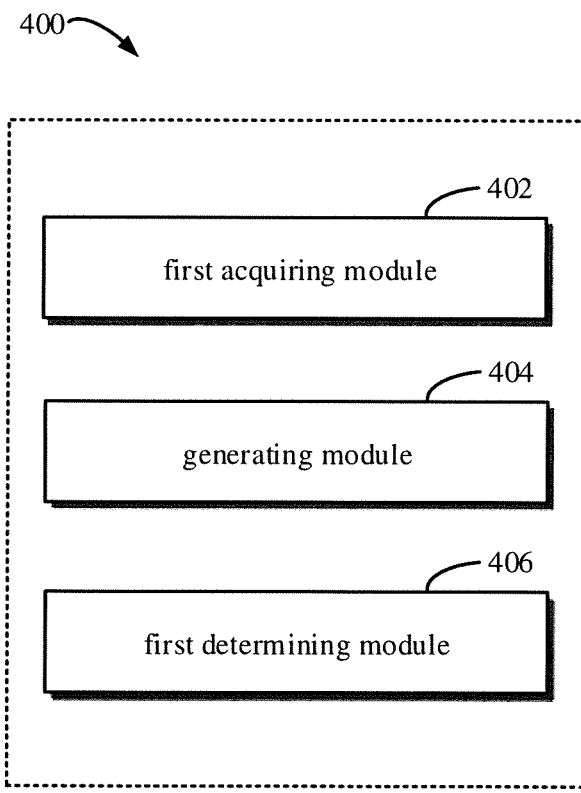
FIG. 4 is a block diagram illustrating an apparatus for identity authentication according to some embodiments of the present disclosure.

FIG. 4 is a block diagram illustrating an apparatus 400 for identity authentication according to some embodiments of the present disclosure. The device 400 may be included in or at least partially implemented by the intelligent sound box 104 in FIG. 1. As shown in FIG. 4, the apparatus 400 includes: a first acquiring module 402, configured to acquire a signal of a speech of a user; a generating module 404, configured to generate feature data with a plurality of dimensions based on the signal, the feature data with the plurality of dimensions indicate different characteristics of the signal; and a first determining module 406, configured to determine an identity of the user based on the feature data.

In some embodiments, the plurality of dimensions include at least two of: speed, loudness, pitch, frequency, and timbre.

In some embodiments, the first determining module 406 includes: a second determining module, configured to determine a number of sentences associated with a predefined identity and comprised in the voice signal; and a third determining module, configured to determine the identity of the user as the predefined identity in response to a ratio of the determined number to a total number of sentences included in the voice signal greater than a threshold ratio.

In some embodiments, the first determining module 406 includes: a fourth determining module, configured to determine a category of the signal based on the feature data; a second acquiring module, configured to acquire a correspondence between the category of the signal and the identity of the user; and a fifth determining module, configured to determine the identity of the user as the identity corresponding to the category based on the correspondence.

In some embodiments, the category of the signal is determined by an unsupervised learning model.

In some embodiments, the apparatus 400 further includes: a sixth determining module, configured to determine a permission of the user based on the identity of the user; and a triggering module, configured to trigger a task matching the permission of the user to be executed.

Figure 5:
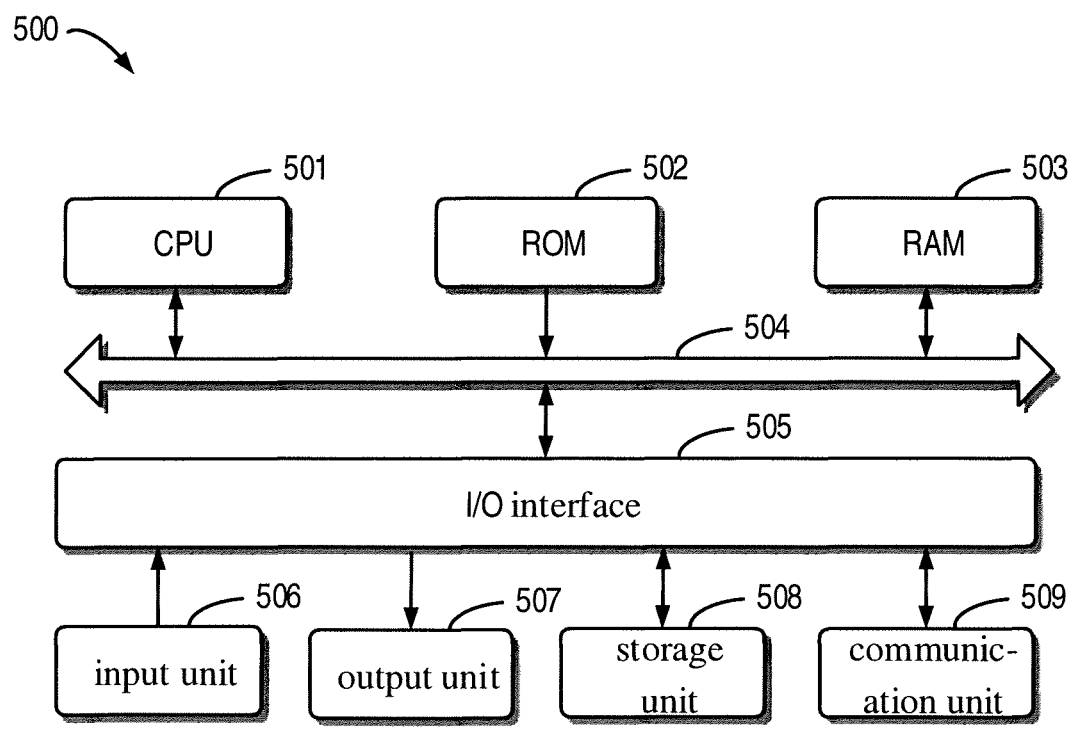
FIG. 5 is a block diagram illustrating an electronic device capable of implementing some embodiments of the present disclosure.

FIG. 5 is a block diagram illustrating a device 500 capable of implementing some embodiments of the present disclosure. The device 500 may be used to implement the intelligent sound box 104 in FIG. 1. As shown in the figure, the device 500 includes a central processing unit (CPU) 501, which can perform various appropriate actions and processing according to computer program instructions stored in a read-only memory (ROM) 502 or loaded from a memory unit 508 to a random access memory (RAM) 503. In the RAM 503, various programs and data needed for the operation of the device 500 may also be stored. The CPU 501, the ROM 502, and the RAM 503 are connected to each other via a bus 504. An Input/output (I/O) interface 505 is also connected to the bus 504.

A plurality of components in the device 500 are connected to the I/O interface 505, including: an input unit 506, such as a keyboard, a mouse, and the like; an output unit 507, such as various types of monitors, speakers, and the like; a storage unit 508, such as a disk, a CD, and the like; and a communication unit 509, such as a network card, a modem, a wireless communication transceiver, and the like. The communication unit 509 allows the devices 500 to exchange information/data with other devices through computer networks such as the Internet and/or various telecommunications networks.

The various procedures and processing described above, such as the method 200, can be performed by the processing unit 501. For example, in some embodiments, the method 200 may be implemented as computer software programs physically contained in a machine-readable medium, such as the storage unit 508. In some embodiments, part or all of the computer programs may be loaded and/or installed on the device 500 via the ROM 502 and/or the communication unit 509. When the computer programs are loaded into the RAM 503 and executed by the CPU 501, one or more steps of the method 200 described above can be performed. Alternatively, in other embodiments, the CPU 501 may be configured to execute the method 200 by any other appropriate means (for example, by means of firmware).

The present disclosure may be a method, a device, a system, and/or a computer program product. The computer program product may include a computer readable storage medium having computer readable program instructions loaded thereon for executing various aspects of the present disclosure.

The computer readable storage medium may be a tangible device that can hold and store the instructions used by an instruction executing device. For example, the computer readable storage medium may be, but are not limited to, an electrical storage device, a magnetic storage device, an optical storage device, an electromagnetic storage device, a semiconductor storage device or any appropriate combination thereof. More specific examples of the computer readable storage medium (non-exhaustive list) include: a portable computer disk, a hard disk, a random access memory (RAM), a read-only memory (ROM), an erasable programmable read-only memory (EPROM or flash), a static random access memory (SRAM), a portable compressor disk read-only memory (CD-ROM), a digital versatile disk (DVD), a memory stick, a floppy disk, a mechanical coding equipment, such as a punch card or a concave convex structure on which instructions are stored, and any appropriate combination of the above. The computer readable storage medium used herein is not interpreted as instantaneous signals themselves, such as radio waves or other free-propagating electromagnetic waves, electromagnetic waves propagated through waveguides or other transmission media (for example, light pulses through fiber-optic cables), or electrical signals transmitted through wires.

The computer readable program instructions described herein may be downloaded from the computer readable storage medium to various computing/processing devices, or to external computers or storage devices over a network, such as the Internet, a local area network, a wide area network, and/or a wireless network. The network may include a copper transmission cable, a fiber optic transmission, a wireless transmission, a router, a firewall, a switch, a gateway computer and/or an edge server. A network adapter card or a network interface in each computing/processing device receives the computer readable program instructions from the network and forwards such computer readable program instructions for storage in the computer readable storage medium in each computing/processing device.

The computer program instructions used to perform the present disclosure may be assembly instructions, instruction set architecture (ISA) instructions, machine instructions, machine-related instructions, microcode, firmware instructions, state-setting data, or source or object code written in any combination of one or more programming languages, the programming languages include object-oriented programming languages such as Smalltalk, C++, and so on, as well as regular procedural programming languages such as "C" or similar programming languages. The computer readable program instructions may be fully executed on a user's computer, partially executed on the user's computer, executed as a separate software package, partially executed on the user's computer, partially executed on a remote computer, or completely executed on the remote computer or server. In the case of the remote computer, the remote computer may be connected to the user's computer through any kind of network—including a local area network (LAN) or a wide area network (WAN)—or, it may be connected to an external computer (for example, using an Internet service provider to connect over the Internet). In some embodiments, an electronic circuit, such as a programmable logic circuit, a field programmable gate array (FPGA) or a programmable logic array (PLA), are personalized by using the state information of the computer readable program instructions. The electronic circuit may execute the computer readable program instructions to realize various aspects of the present disclosure.

Each aspect of the present disclosure is described herein with reference to flow charts and/or block diagrams of the method, the apparatus (system) and the computer program product in accordance with embodiments of the present disclosure. It should be understood that, each block of the flow charts and/or block diagrams and the combination of all the blocks in the flow charts and/or block diagrams can be implemented by the computer readable program instructions.

These computer readable program instructions may be provided to a processing unit of a general purpose computer, a special purpose computer, or other programmable data processing apparatuses, so as to produce a machine, causes the execution of these instructions through the processing unit of a computer or other programmable data processing apparatus to produce an apparatus that implements the functions/actions specified in one or more blocks in the flow charts and/or the block diagrams. These computer readable program instructions may also be stored in the computer readable storage medium, these instructions enable computers, programmable data processing apparatuses, and/or other devices to work in a particular way. The computer readable medium in which the instructions are stored, in turn, includes a manufacturing product consisting of instructions that implement all aspects of the functions/actions specified in one or more blocks in the flow charts and/or the block diagrams.

The computer readable program instructions may also be loaded onto computers, other programmable data processing apparatuses, or other devices, to cause a series of steps to be performed on the computers, other programmable data processing apparatuses, or other devices to produce a procedure of computer implementation, thus enabling instructions executed on computers, other programmable data processing apparatuses, or other devices to perform functions/actions specified in one or more blocks in the flow charts and/or the block diagrams.

The flow charts and block diagrams in the attached drawings show the architecture, functions and operations that may be realized by the system, the method and the computer program product in accordance with the plurality of embodiments of the present disclosure. At this point, each block in the flow charts or block diagrams can represent a module, a program segment, or part of the instructions, the module, the program segment, or part of the instruction includes one or more executable instructions for implementing specified logical functions. In some implementations as replacements, the functions annotated in the block may also occur in a different order than those annotated in the attached drawings. For example, two consecutive blocks may actually be executed in basically parallel, or sometimes in reverse order, depending on the function involved. It should also be noted that, each block in the block diagrams and/or the flow charts and the combination of blocks in the block diagrams and/or the flow charts may be implemented by a dedicated hardware-based system that performs a specified function or action, or by a combination of dedicated hardware and computer instructions.

The above has described embodiments of the present disclosure. The above description is exemplary, not exhaustive, and is not limited to the disclosed embodiments. Without deviating from the scope and spirit of the embodiments described, various modifications and changes are obvious to those ordinary skilled in the art. The choice of terms used herein is intended to best explain the principles, practical applications or improvements to technologies in the market of each embodiment, or to enable other ordinary skilled in the art to understand the embodiments of the present disclosure.

What is claimed is:

1. A method for identity authentication, comprising:
   acquiring a signal of a speech of a user;
   generating feature data with a plurality of dimensions based on the signal, the feature data with the plurality of dimensions indicating different characteristics of the signal; and
   determining an identity of the user based on the feature data;
   wherein determining the identity of the user comprises:
   determining a number of sentences associated with a predefined identity and comprised in the signal; and
   in response to a ratio of the number determined to a total number of sentences comprised in the signal greater than a threshold ratio, determining the identity of the user as the predefined identity.

2. The method according to claim 1, wherein the plurality of dimensions comprise at least two of:
   speed, loudness, pitch, frequency, and timbre.

3. The method according to claim 1, wherein determining the identity of the user comprises:
- determining a category of the signal based on the feature data;
- acquiring a correspondence between the category of the signal and the identity of the user; and
- determining the identity of the user as the identity corresponding to the category based on the correspondence.

4. The method according to claim 3, wherein the category of the signal is determined by an unsupervised learning model.

5. The method according to claim 1, further comprising:
- determining a permission of the user based on the identity of the user; and
- triggering a task matching the permission of the user to be executed.

6. An apparatus for identity authentication, comprising:
- one or more processors and a memory, wherein the one or more processors are configured to:
- acquire a signal of a speech of a user;
- generate feature data with a plurality of dimensions based on the signal, the feature data with the plurality of dimensions indicating different characteristics of the signal; and
- determine an identity of the user based on the feature data;
- wherein the one or more processors determine the identity of the user by performing acts of:
- determining a number of sentences associated with a predefined identity and comprised in the signal; and
- in response to a ratio of the number determined to a total number of sentences comprised in the signal greater than a threshold ratio, determining the identity of the user as the predefined identity.

7. The apparatus according to claim 6, wherein the plurality of dimensions comprise at least two of:
- speed, loudness, pitch, frequency, and timbre.

8. The apparatus according to claim 6, wherein the one or more processors determine the identity of the user by performing acts of:
- determining a category of the signal based on the feature data;
- acquiring a correspondence between the category of the signal and the identity of the user; and
- determining the identity of the user as the identity corresponding to the category based on the correspondence.

9. The apparatus according to claim 8, wherein the category of the signal is determined by an unsupervised learning model.

10. The apparatus according to claim 6, wherein the one or more processors are configured to:
- determine a permission of the user based on the identity of the user; and
- trigger a task matching the permission of the user to be executed.

11. A computer readable storage medium, stored thereon with computer programs that, when executed by a processor, the processor is caused to perform a method for identity authentication, wherein the method comprises:
- acquiring a signal of a speech of a user;
- generating feature data with a plurality of dimensions based on the signal, the feature data with the plurality of dimensions indicating different characteristics of the signal; and
- determining an identity of the user based on the feature data;
- wherein determining the identity of the user comprises:
- determining a number of sentences associated with a predefined identity and comprised in the signal; and
- in response to a ratio of the number determined to a total number of sentences comprised in the signal greater than a threshold ratio, determining the identity of the user as the predefined identity.

* * * * *